United States Patent
Maly et al.

[11] Patent Number: 5,845,930
[45] Date of Patent: Dec. 8, 1998

[54] SIDE IMPACT AIRBAG MODULE DEPLOYMENT DOOR FOR VEHICLE SEAT

[75] Inventors: Timothy M. Maly, Plymouth; Donald J. Paxton, Romeo; Scott A. Meyer, Orion, all of Mich.

[73] Assignee: Morton International, Inc., Chicago, Ill.

[21] Appl. No.: 847,694

[22] Filed: Apr. 28, 1997

[51] Int. Cl.$^6$ .................................................. B60R 21/22
[52] U.S. Cl. ..................................... 280/728.3; 280/730.2
[58] Field of Search ....................... 280/730.2, 730.1, 280/728.2, 728.3, 728.1

[56] References Cited

U.S. PATENT DOCUMENTS

| | | | |
|---|---|---|---|
| 3,966,227 | 6/1976 | Cameron | 280/752 |
| 5,161,819 | 11/1992 | Rhodes, Jr. | 280/728 |
| 5,308,112 | 5/1994 | Hill et al. | 280/730 A |
| 5,326,131 | 7/1994 | Yokota et al. | 280/728.1 |
| 5,431,435 | 7/1995 | Wilson | 280/728.3 |
| 5,445,410 | 8/1995 | Czapp et al. | 280/728.3 |
| 5,447,326 | 9/1995 | Laske et al. | 280/728.3 |
| 5,533,749 | 7/1996 | Leonard et al. | 280/728.3 |
| 5,556,129 | 9/1996 | Coman et al. | 280/730.2 |
| 5,601,332 | 2/1997 | Schultz et al. | 297/216.13 |
| 5,667,242 | 9/1997 | Slack et al. | 280/728.2 |

FOREIGN PATENT DOCUMENTS

| | | | |
|---|---|---|---|
| 94/25312 | 10/1994 | WIPO | 280/728.3 |

*Primary Examiner*—Eric D. Culbreth
*Attorney, Agent, or Firm*—George W. Rauchfuss, Jr.

[57] ABSTRACT

A seat-mounted side impact airbag module deployment door and a vehicle seat having such a deployment door are provided by a deployment door having a fabric outer panel, a fabric inner panel and an intermediate panel of rigid, resilient material, and in which the inner panel has spaced, parallel engagement elements held by retaining elements on the outer surface of sidewalls of a canister housing of an airbag module assembly placed in a seat recess and attached to an internal structural member of the seat. The fabric outer panel of the deployment door matches the adjacent fabric trim cover portion of the seat into which the deployment door is mounted.

20 Claims, 2 Drawing Sheets

SIDE IMPACT AIRBAG MODULE DEPLOYMENT DOOR FOR VEHICLE SEAT

FIELD OF THE INVENTION

This invention relates to a seat-mounted side impact airbag module deployment door. More particularly this invention relates to such a door having the advantages of a separate deployment door but also being a door conforming to the outward appearance of the adjacent trim or finish cover portion of the fabric of the vehicle seat. This invention further relates to a vehicle seat employing such a deployment door.

BACKGROUND OF THE INVENTION

In the past, seat-mounted side impact airbags have generally had two means of deployment, either through a separate plastic or rubber door attached to the seat or through a rupturable or frangible seam in the finish or trim fabric of the seat. While the separate door mode has allowed for some consistency in location of deployment of the airbag from the seat, such separate plastic or rubber doors have left much to be desired aesthetically from a styling point of view, particularly due to color matching problems and problems associated with lack of a proper and aesthetically pleasing fit between the door and the trim fabric of the seat.

Deploying through a rupturable seam in the trim fabric of the seat generally eliminates the fit and color matching drawbacks, but creates a deployment consistency problem. Furthermore, since motor vehicles are offered in numerous seat trim fabrics, it becomes necessary to test for the deployment characteristics of each of the fabrics since the fabrics vary widely in their rate and direction of tear at under given force. Also, the various fabrics age differently and have different abrasion resistance characteristics which can affect the manner of deployment and the rupturing of the frangible seam.

It is, therefore, an object of this invention to provide a seat-mounted side impact airbag deployment door that provides the reliable deployment characteristics of a separate deployment door yet eliminates one or more of the drawbacks previously associated therewith, particularly the aesthetic color and fit considerations. A further object of this invention is to provide such a deployment door which aesthetically matches the trim cover fabric of the seat in which the door is to be mounted. Another object of this invention is to provide vehicle seats having such deployment doors mounted therein.

BRIEF SUMMARY OF THE INVENTION

This invention provides a side-impact airbag deployment door for mounting in a deployment opening in the fabric trim cover portion of a vehicle seat, wherein the deployment door has a fabric outer trim panel, a generally parallel inner panel and an intermediate panel of rigid, resilient material, with the fabric of the outer trim panel being the same as the fabric of the finish or trim cover of the seat into which the deployment door is to be installed. The inner panel is also preferably a fabric panel which may either be of the same fabric or different fabric from the trim fabric of the seat cover. Extending transversely inwardly from the inner panel are generally parallel, spaced engagement means for being secured to retaining members on the sidewalls of a trough-shaped canister housing secured to an internal structural member of the seat. The canister housing is located in a recess in the seat adjacent the structural member. The trough-shaped canister contains an inflator and a folded, inflatable airbag cushion with the canister trough opening facing the deployment opening in the fabric trim cover portion of the seat. Either one of the engagement means or one of the retaining means is rupturable upon deployment of the airbag cushion so that the deployment door opens permitting the inflating airbag cushion to exit the deployment opening in the fabric trim cover portion.

In a preferred embodiment of this invention, the deployment door and the vehicle seat with the deployment door installed comprises: an internal structural seat member; a recess in the seat adjacent the internal structural member, the recess leading to a deployment opening in a fabric trim cover portion of the seat; an airbag module assembly in said recess secured to the internal structural member, the airbag module assembly comprising a canister housing, an inflator and a folded deployable airbag cushion in fluid communication with said inflator for receiving inflation gases from said inflator, the canister housing having opposing first and second sidewalls defining a trough opening for deployment of the inflatable airbag cushion through the deployment opening in the fabric trim cover, first deployment door retaining means on said first sidewall and second deployment door retaining means on said second sidewall; and a deployment door positioned in said deployment opening in the fabric trim cover portion of the seat, the deployment door having a fabric outer trim panel, an inner panel, and an intermediate panel of rigid, resilient material, the fabric of the outer trim panel being of the same fabric as the fabric of the trim cover portion of the seat, spaced first and second engagement means positioned on and extending generally transversely inwardly from the inner panel, with the first and second engagement means secured, respectively, by the first and second deployment door retaining means on the canister sidewalls, and with one of the first deployment door retaining means or the first engaging means being rupturable upon deployment of the airbag cushion to permit the deployment door to pivot around the second engagement means thereby opening the deployment opening in the fabric trim cover portion of the seat.

An even more preferred embodiment of the deployment door and the vehicle seat with the deployment door installed comprises an embodiment with the following additional features. The first engaging means is rupturable upon deployment of the airbag cushion for permitting said deployment door to pivot around the second engagement means to open the deployment opening in the fabric trim cover portion of the seat; the spaced first and second engagement means comprise parallel, spaced first and second fabric strips extending from the inner panel of the door, the first fabric strip being rupturably attached along a proximal edge thereof to the inner panel and the second fabric strip being non-rupturably attached along a proximal edge thereof to the inner panel; each of the first and second fabric strips define, at a distal edge thereof, a fabric channel housing a retaining rod or pin for being retained by the deployment door retaining means which comprises a hook element on each of the canister sidewalls; the inner panel is a fabric panel, the rigid, resilient material of the intermediate panel is a foamed plastic material, and peripheral edges of the fabric inner and outer panels are joined forming an enclosure around the intermediate panel; the proximal edge of the first fabric strip is rupturably attached to the inner panel by rupturable stitching; the first fabric strip has notches along its proximal edge interrupting the rupturable stitching; and the fabric channel at the distal edge of each of the first and second fabric strips defines a plurality of notches along said fabric channel for providing access to the retaining rods or pins by the hook elements on the sidewalls of the canister housing.

BRIEF DESCRIPTION OF THE DRAWINGS

The invention is illustrated, but not limited to, by the embodiment disclosed in the following drawings in which.

DETAILED DESCRIPTION OF THE INVENTION

Figure 1:
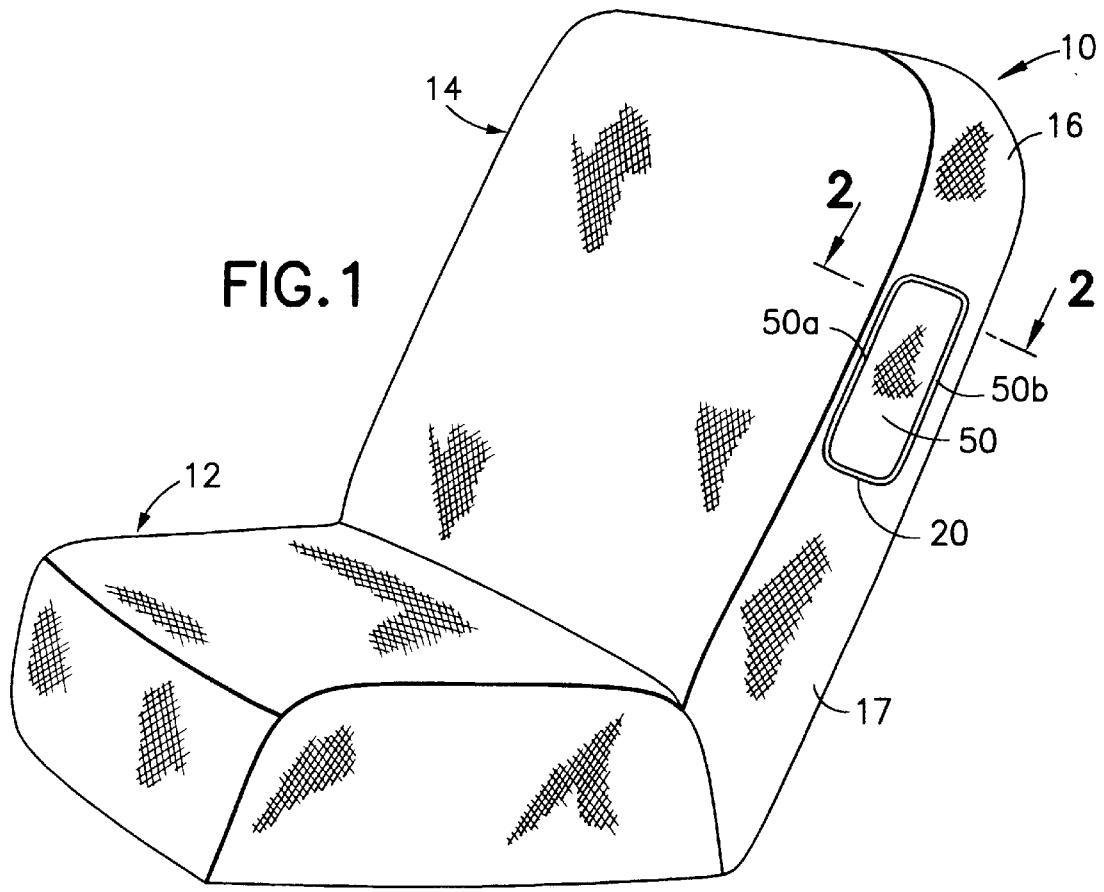
FIG. 1 is of a vehicle seat having installed therein a side impact airbag deployment door of this invention.
Figure 2:
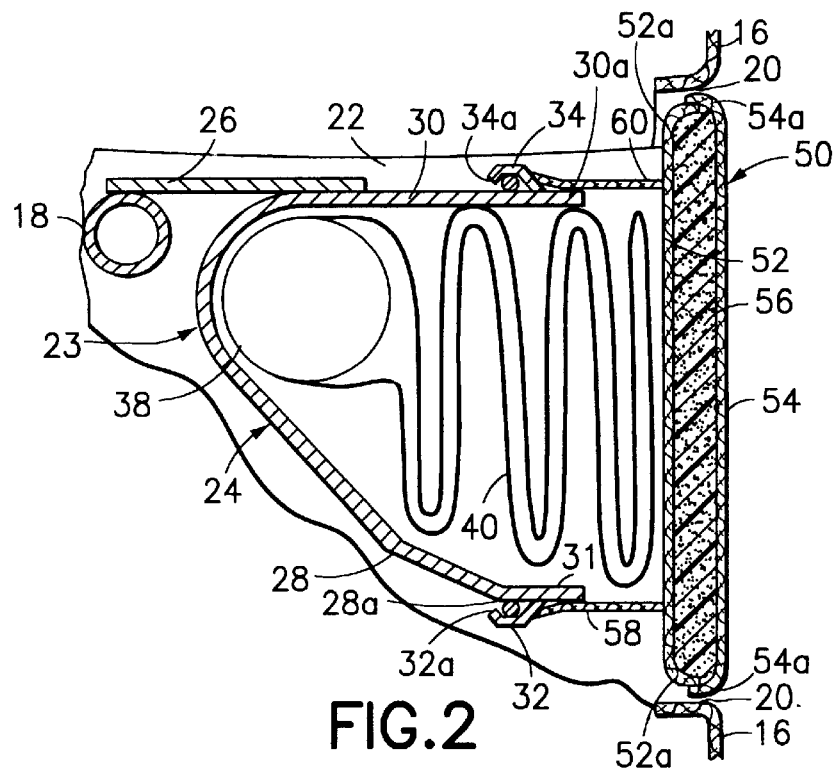
FIG. 2 is an enlarged sectional view taken along line 2—2 of FIG. 1.
Figure 3:
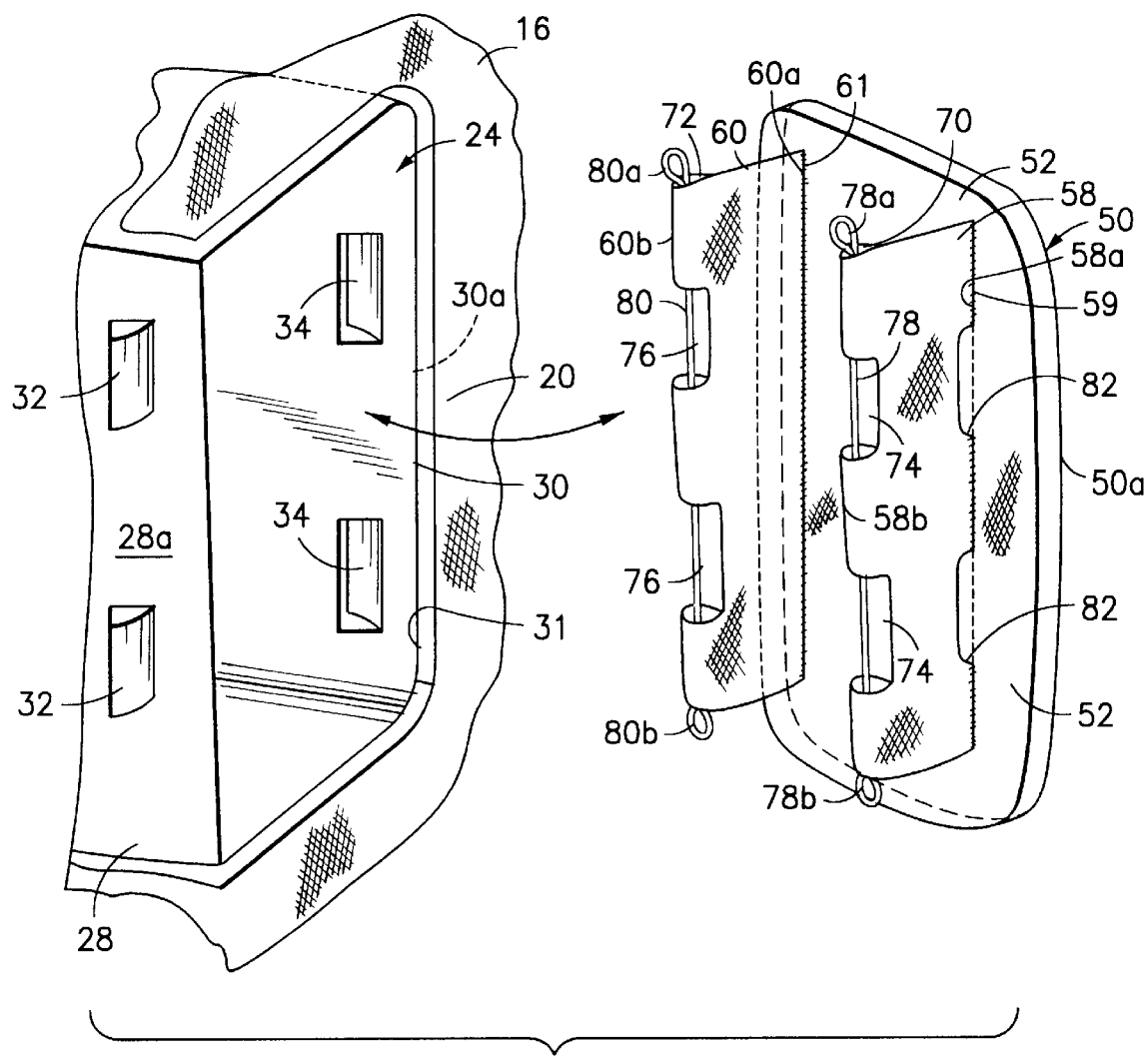
FIG. 3 is an exploded, fragmentary perspective view of a canister housing (with the airbag cushion omitted for simplicity in illustrating the invention) positioned in a deployment opening in the fabric trim cover of the seat and a deployment door of this invention.

A preferred embodiment of the deployment door and a vehicle seat employing the deployment door is illustrated in FIGS. 1 to 3 wherein like reference numerals refer to the same elements in the Figures.

A vehicle seat 10, in this case, a driver's side seat, is illustrated in FIG. 1. The seat 10 comprises a seat bottom portion 12 and a seat back portion 14. The seat back portion 14 is finished or trimmed with a fabric covering 16. On a side 17 of the seat back 14 facing a vehicle door (not shown) there is a deployment opening 20 through the trim fabric covering 16. A deployment door 50 of this invention is mounted in the deployment opening 20. As will be explained later, door 50 opens along its forward or leading edge 50a by pivoting essentially along its trailing edge 50b. It will be appreciated that the seat could be a passenger side seat rather than a driver's side seat and in that case the deployment opening and deployment door would be located on the side of seat opposite side 17.

The details of the deployment door structure and its relationship to the seat structure is illustrated in FIGS. 2 and 3. Seat 10 has a tubular internal structural member 18. A recess 22 extends between the internal structural member 18 and the deployment opening 20 in the seat trim fabric 16. In the recess 22 is an airbag module assembly 23 comprising a canister housing 24 in which is located an inflator 38 and a folded, inflatable airbag cushion 40 in fluid communication with the inflator so that the airbag cushion can receive inflation gases from the inflator. The canister housing 24 is secured, such as by way of a welded bracket 26, to the structural member 18. The canister housing 24 is an open trough-shaped housing defined by first and second generally opposing sidewalls 28, 30 defining a trough opening 31 for deployment of an inflating airbag out of the canister housing towards deployment opening 20.

On each of the outer surfaces 28a and 30a of opposing sidewalls 28, 30 of the canister housing 24 are deployment door retaining members 32, 34, generally in the form of projections or hooks with the open ends 32a, 34a of the projections or hooks facing away from the trough opening 31. In one form of the invention, the canister housing 24 is a shaped or extruded metal housing and projections or hooks 32 and 34 are formed by stamping tabs out of the sidewalls 28 and 30. It will be appreciated that the deployment door retaining members 32 and 34 can be of various shapes complementary to correspond engaging means on the deployment door 50. Each sidewall 28 and 30 will generally have a plurality, at least two, of the respective deployment door retaining members 32 and 34 positioned on the sidewall as illustrated in FIG. 3.

The deployment door comprises a fabric outer trim panel 54, a generally parallel inner panel 52, and an intermediate panel 56 of rigid, resilient material, generally a foamed plastic. The fabric of outer panel 54 is chosen to match the fabric of fabric trim cover 16 of seat 10. Inner panel 52 is also preferably fabric and may be of the same fabric as outer panel 54 and trim cover 16 or can be of a different fabric. It will be understood that by use of the term fabric it is intended that the term embraces the wide variety of materials used as trim covering for automotive seats, such as leather, suede, natural and synthetic fiber fabrics, fabrics from plastic fibers and the like. In a preferred form of this invention, the inner and outer panels 52, 54 are both fabric and have their peripheral edges 52a, 54a (FIG. 2) joined together, such as by stitching, to form an enclosure surrounding the intermediate plastic foam layer 56.

On the inner panel 52, extending generally transversely inwardly therefrom, are spaced first and second deployment door engagement elements 58 and 60. In the embodiment illustrated, engagement elements 58 and 60 comprise parallel fabric strips attached to the inner panel 52, with the fabric strip closest to the leading edge 50a of the door 50, namely fabric strip 58, being joined at its proximal edge 58a to the inner panel by stitching 59 that is rupturable upon deployment of the airbag cushion 40, and the fabric strip 60 nearest the trailing edge 50b of the door, namely fabric strips 59, joined at its proximal edge 60a to the inner panel by stitching 61 that is non-rupturable upon and during deployment of the airbag cushion.

Each of fabric strips 58, 60 has its distal edge 58b and 60b, respectively, folded back on and joined to itself to form a tunnel or channel 70 and 72, respectively. At least one, but preferably a plurality of apertures 74 and 76, respectively, are provided in tunnels 70, 72. These apertures 74, 76 are located along the distal edge of the fabric strips 58, 60 so as to coincide with the placement of retaining elements 32 and 34 on sidewalls 28 and 30 of canister housing 24.

A retaining pin or rod 78 and 80 is provided in each of tunnels 70 and 72 and they are exposed in the area of apertures 74 and 76. At the respective ends of rods or pins 78 and 80 there can be provided anchoring elements 78a and 78b and 80a and 80b such as looped eyes, to hold the pins or rods in the tunnels 70 and 72 and prevent vertical displacement of said pins or rods. It will be appreciated that it is possible not to need these anchoring elements as the pins or rods 78 and 80 may be sized to snap into and be securely held in place in retaining hooks or projections 32 and 34.

Deployment door 50 is mounted in deployment opening 20 in the seat trim fabric 16 with retaining rods or pins 78 and 80 retained, respectively, in retaining elements 32 and 34 thereby holding the deployment door inwardly against outward forces of the folded airbag cushion 40 in the canister housing 24. In this manner the fabric outer panel 54 of deployment door 50 can be arranged flush with the fabric trim cover portion 16 of seat 10, as shown in FIG. 1. The fabric outer panel 54 with the rigid but resilient intermediate foam panel 56 provides the deployment door with a soft feel and is able to readily and more easily conform to the shape of deployment opening 20 giving the appearance of essentially being an unbroken piece of trim fabric.

Upon activation of the inflator 38, by a signal from a sensor (not shown), the inflator will dispense inflation gases into airbag cushion 40 in a manner known in the art. The resulting inflation and deployment of airbag cushion 40 will cause the inflating airbag cushion to press forcefully against the inner panel 52 of the deployment door 50 rupturing rupturable joint 59 and opening the forward edge 50a of the door, permitting the door to pivot about non-rupturable joint 61 of fabric strip 60 thereby opening deployment opening 20 to permit the inflating airbag cushion to deploy therethrough between the seat 10 and the vehicle door (not shown).

In a preferred form of the invention, fabric strip 58 may be provided, along its proximal edge 58a, with a plurality of notches 82 in the fabric so as to provide interruptions along rupturable joint 59 to enable the rupturable joint to rupture more easily.

The deployment door of this invention provides a deployment door that blends in with the appearance and "feel" of the adjacent trim cover portion of the vehicle seat and creates essentially a perfect aesthetic match in color and appearance between the trim cover of the seat and the deployment door.

Furthermore, the deployment door of this invention, besides matching the fabric appearance of the seat trim fabric, provides for a consistent deployment path for an inflating airbag cushion exiting from the module assembly attached to an internal structural member of the vehicle seat.

With the foregoing description of the invention, those skilled in the art will appreciate that modifications may be made to the invention without departing from the spirit thereof. Therefore, it is not intended that the scope of the invention be limited to the specific embodiments illustrated and described.

Claims:

1. A motor vehicle seat comprising:

an internal structural member;

a recess in said seat adjacent the internal structural member, said recess leading to a deployment opening in a fabric trim cover portion of the seat;

an airbag module assembly in said recess secured to the internal structural member, said airbag module assembly comprising a canister housing, an inflator and a folded deployable airbag cushion in fluid communication with said inflator for receiving inflation gases from said inflator, the canister housing having opposing first and second sidewalls defining a trough opening for deployment of the inflatable airbag cushion through the deployment opening in the fabric trim cover, first deployment door retaining means on said first sidewall and second deployment door retaining means on said second sidewall; and a deployment door positioned in said deployment opening in the fabric trim cover portion of the seat, said deployment door comprising a fabric outer trim panel, an inner panel, and an intermediate panel of, resilient material, the fabric of the outer trim panel being of the same fabric as the fabric of the trim cover portion of the seat, spaced first and second engagement means positioned on and extending generally transversely inwardly from said inner panel, said first and second engagement means secured respectively, by the first and second deployment door retaining means on the canister sidewalls, one of said first deployment door retaining means and said first engaging means being rupturable upon deployment of the airbag cushion to permit said deployment door to pivot around said second engagement means opening said deployment opening in the fabric trim cover portion of the seat.

2. A motor vehicle seat according to claim 1 wherein said first engaging means is rupturable upon deployment of the airbag cushion for permitting said deployment door to pivot around said second engagement means to open the deployment opening in the fabric trim cover portion of the seat.

3. A motor vehicle seat according to claim 1 wherein said first engaging means being rupturable upon deployment of the airbag cushion for permitting said deployment door to pivot around said second engagement means to open the deployment opening in the fabric trim cover portion of the seat;

said spaced first and second engagement means comprise parallel, spaced first and second fabric strips extending from the inner panel of the door, said first fabric strip being rupturably attached along a proximal edge thereof to the inner panel and the second fabric strip being non-rupturably attached along a proximal edge thereof to the inner panel;

each of the first and second fabric strips define, at a distal edge thereof, a fabric channel housing a rod for being retained by the deployment door retaining means comprising a hook element on each of the canister sidewalls;

the inner panel is a fabric panel, the, resilient material of the intermediate panel is a foamed plastic material, and peripheral edges of the fabric inner and outer panels are joined forming an enclosure around the intermediate panel;

the proximal edge of the first fabric strip is rupturably attached to the inner panel by rupturable stitching;

the first fabric strip has notches along its proximal edge interrupting the rupturable stitching; and the fabric channel at the distal edge of each of the first and second fabric strips defines a plurality of notches along said fabric channel for providing access to said rods by the hook elements on the sidewalls of the canister housing.

4. A motor vehicle seat comprising:

an internal structural member;

a recess in said seat adjacent the internal structural member, said recess leading to a deployment opening in a fabric trim cover portion of the seat;

an airbag module assembly in said recess secured to the internal structural member, said airbag module assembly comprising a canister housing, an inflator and a folded deployable airbag cushion in fluid communication with said inflator for receiving inflation gases from said inflator, the canister housing having opposing first and second sidewalls defining a trough opening for deployment of the inflatable airbag cushion through the deployment opening in the fabric trim cover, first deployment door retaining means on said first sidewall and second deployment door retaining means on said second sidewall; and a deployment door positioned in said deployment opening in the fabric trim cover portion of the seat, said deployment door comprising a fabric outer trim panel, an inner panel, and an intermediate panel of, resilient material, the fabric of the outer trim panel being of the same fabric as the fabric of the trim cover portion of the seat, spaced first and second engagement means positioned on and extending generally transversely inwardly from said inner panel, said first and second engagement means secured respectively, by the first and second deployment door retaining means on the canister sidewalls, one of said first deployment door retaining means and said first engaging means being rupturable upon deployment of the airbag cushion to permit said deployment door to pivot around said second engagement means opening said deployment opening in the fabric trim cover portion of the seat, and wherein said spaced first and second engagement means comprise parallel, spaced first and second fabric strips extending from the inner panel of the door, said first fabric strip being rupturably attached along a proximal edge thereof to the inner panel and the second fabric strip being non-rupturably attached along a proximal edge thereof to the inner panel.

5. A motor vehicle seat according to claim 3 wherein each of the first and second fabric strips define, at a distal edge thereof, a fabric channel housing a rod for being retained by the deployment door retaining means, said deployment door retaining means comprising a hook element on each of the canister sidewalls.

6. A motor vehicle seat according to claim 5 wherein the inner panel is a fabric panel, the, resilient material of the intermediate panel is a foamed plastic material, and peripheral edges of the fabric inner and outer panels are joined forming an enclosure around the intermediate panel.

7. A motor vehicle seat according to claim 6 wherein the proximal edge of the first fabric strip is rupturably attached to the inner panel by rupturable stitching.

8. A motor vehicle seat according to claim 7 wherein the first fabric strip has notches along its proximal edge interrupting the rupturable stitching.

9. A motor vehicle seat according to claim 4 wherein the first fabric strip has notches along its proximal edge.

10. A motor vehicle seat according to claim 5 wherein the fabric channel at the distal edge of each of the first and second fabric strips defines a plurality of notches along said fabric channel or providing access to said rods by the hook elements on the sidewalls of the canister housing.

11. A side-impact airbag cushion deployment door for positioning in a deployment opening in a fabric trim cover portion of a vehicle seat having an airbag module assembly in a recess in said seat and secured to an internal structural seat member, the airbag module assembly comprising a canister housing, an inflator, and a folded deployable airbag cushion in fluid communication with the inflator for receiving inflation gases from the inflator, the canister housing having opposing first and second sidewalls defining a trough opening for deployment of the inflatable airbag cushion through the deployment opening in the trim cover, said deployment door comprising:

a fabric outer trim panel, an inner panel, and an intermediate panel of, resilient material, the fabric of the outer trim panel being of the same fabric as the fabric of the trim cover portion of the vehicle seat into which the deployment door is to be positioned; and spaced first and second engagement means positioned on and extending generally transversely inwardly from said inner panel, said first and second engagement means securable, respectively, to first and second deployment door retaining means on the first and second canister sidewalls.

12. A deployment door according to claim 11 wherein said first engaging means being rupturable upon deployment of the airbag cushion for permitting said deployment door to pivot around said second engagement means to open the deployment opening in the fabric trim cover portion of the seat.

13. A side-impact airbag cushion deployment door for positioning in a deployment opening in a fabric trim cover portion of a vehicle seat having an airbag module assembly in a recess in said seat and secured to an internal structural seat member, the airbag module assembly comprising a canister housing, an inflator, and a folded deployable airbag cushion in fluid communication with the inflator for receiving inflation gases from the inflator, the canister housing having opposing first and second sidewalls defining a trough opening for deployment of the inflatable airbag cushion through the deployment opening in the trim cover, said deployment door comprising:

a fabric outer trim panel, an inner panel, and an intermediate panel of, resilient material, the fabric of the outer trim panel being of the same fabric as the fabric of the trim cover portion of the vehicle seat into which the deployment door is to be positioned;

spaced first and second engagement means positioned on and extending generally transversely inwardly from said inner panel, said first and second engagement means securable, respectively, to first and second deployment door retaining means on the first and second canister sidewalls, and wherein said spaced first and second engagement means comprise parallel, spaced first and second fabric strips extending from the inner panel of the door, said first fabric strip being rupturably attached along a proximal edge thereof to the inner panel and the second fabric strip being non-rupturably attached along a proximal edge thereof to the inner panel.

14. A deployment door according to claim 13 wherein the first fabric strip has notches along its proximal edge.

15. A deployment door according to claim 13 wherein each of the first and second fabric strips define, at a distal adge thereof, a fabric channel housing a rod for being retained by the deployment door retaining means, said deployment door retaining means comprising a hook element on each of the canister sidewalls.

16. A deployment door according to claim 15 wherein the inner panel is a fabric panel, the, resilient material of the intermediate panel is a foamed plastic material, and peripheral edges of the fabric inner and outer panels are joined forming an enclosure around the intermediate panel.

17. A deployment door according to claim 16 wherein the proximal edge of the first fabric strip is rupturably attached to the inner panel by rupturable stitching.

18. A deployment door according to claim 17 wherein the first fabric strip has notches along its proximal edge interrupting the rupturable stitching.

19. A deployment door according to claim 15 wherein the fabric channel at the distal edge of each of the first and second fabric strips defines a plurality of notches along said fabric channel for providing access to said rods by the hook elements on the sidewalls of the canister housing.

20. A deployment door according to claim 11 wherein said first engaging means being rupturable upon deployment of the airbag cushion for permitting said deployment door to pivot around said second engagement means to open the deployment opening in the fabric trim cover portion of the seat;

said spaced first and second engagement means comprise parallel, spaced first and second fabric strips extending from the inner panel of the door, said first fabric strip being rupturably attached along a proximal edge thereof to the inner panel and the second fabric strip being non-rupturably attached along a proximal edge thereof to the inner panel;

each of the first and second fabric strips define, at a distal edge thereof, a fabric channel housing a rod for being retained by the deployment door retaining means comprising a hook element on each of the canister sidewalls;

the inner panel is a fabric panel, the rigid, resilient material of the intermediate panel is a foamed plastic material, and peripheral edges of the fabric inner and outer panels are joined forming an enclosure around the intermediate panel;

the proximal edge of the first fabric strip is rupturably attached to the inner panel by rupturable stitching;

the first fabric strip has notches along its proximal edge interrupting the rupturable stitching; and the fabric channel at the distal edge of each of the first and second fabric strips defines a plurality of notches along said fabric channel for providing access to said rods by the hook elements on the sidewalls of the canister housing.

\* \* \* \* \*